Jan. 5, 1926. 1,568,825

H. A. FRIEND

AUTOMOBILE STEERING GEAR

Filed April 1, 1925   2 Sheets-Sheet 1

H. A. Friend
INVENTOR

BY Victor J. Evans
ATTORNEY

WITNESS:
E. R. Ruppert.

Jan. 5, 1926. 1,568,825
H. A. FRIEND
AUTOMOBILE STEERING GEAR
Filed April 1, 1925 2 Sheets-Sheet 2

H. A. Friend
INVENTOR

Patented Jan. 5, 1926.

1,568,825

UNITED STATES PATENT OFFICE.

HARDY A. FRIEND, OF MARSHALLTOWN, IOWA.

AUTOMOBILE STEERING GEAR.

Application filed April 1, 1925. Serial No. 19,961.

*To all whom it may concern:*

Be it known that I, HARDY A. FRIEND, a citizen of the United States, residing at Marshalltown, in the county of Marshall and State of Iowa, have invented new and useful Improvements in Automobile Steering Gears, of which the following is a specification.

This invention relates to control mechanism for motor vehicles, particularly to steering gears, and has for its object the provision of a novel steering mechanism including reduction gearing whereby to facilitate the turning movement, the device being furthermore so constructed and arranged that it might be installed not only as part of new equipment but also to replace the ordinary steering gear on certain cars.

An important object is the provision of a steering mechanism which will be of the semi-irreversible type and which will therefore make driving much safer, especially under adverse road conditions inasmuch as there will be a reduction in the tendency of the vehicle to swerve from its course when striking stones, ruts or other obstructions, or when traveling in mud, snow or the like.

An additional object is the provision of a device of this character which will be simple and inexpensive in manufacture, easy to install, positive in action, efficient and durable in service, and a general improvement in the art.

With the above and other objects and advantages in view, the invention consists in the details of construction to be hereinafter more fully described and claimed, and illustrated in the accompanying drawings in which:

Figure 1:
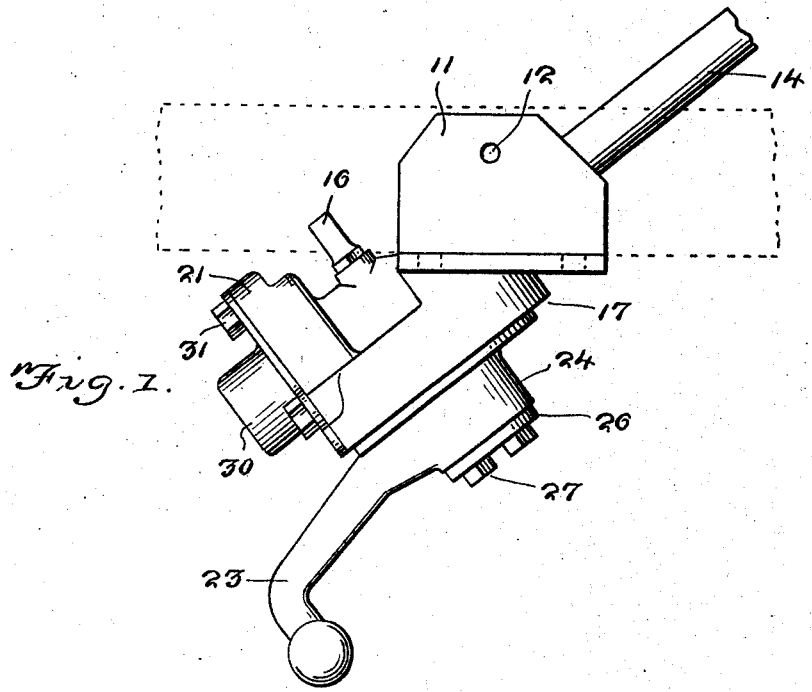
Figure 1 is a side elevation of the complete device.
Figure 2:
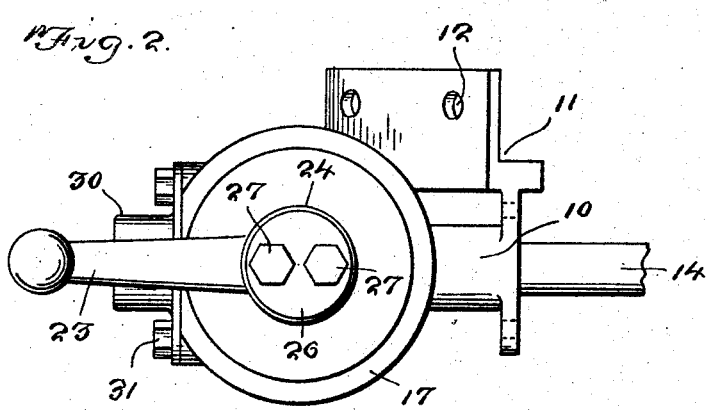
Figure 2 is a top plan view thereof.
Figure 3:
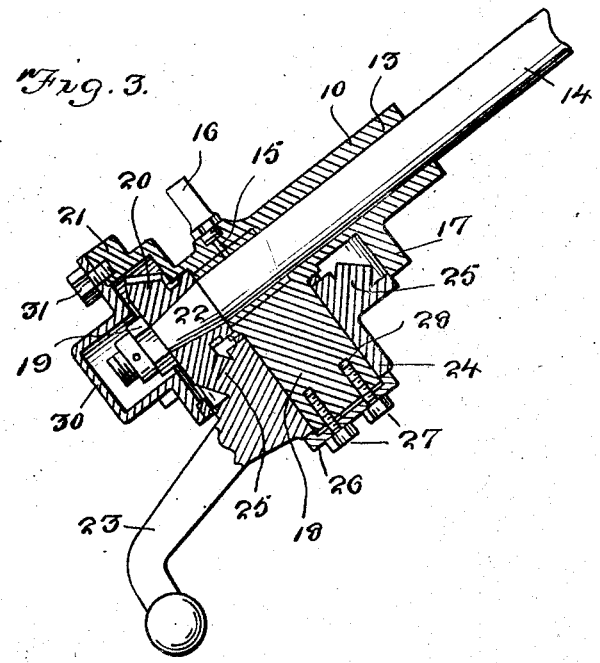
Figure 3 is a longitudinal section.
Figure 4:
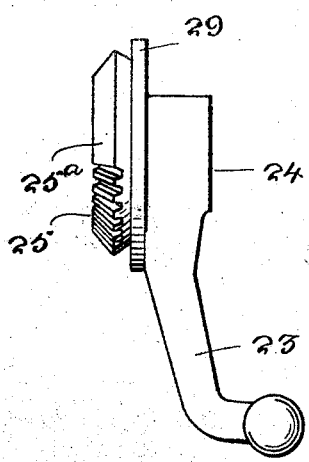
Figure 4 is a detail side elevation of the ball arm.
Figure 5:
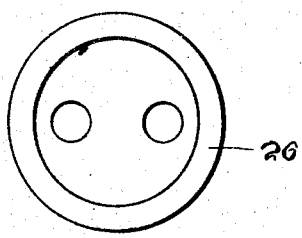
Figure 5 is a detail view.

Referring more particularly to the drawings, I have shown the device as comprising a body 10 which may in actual practice be formed as a single casting and which is provided with an angular bracket member 11 apertured at 12 for the passage of a suitable bolt, rivet or the like whereby the device may be easily attached to the frame of a motor vehicle. The body 10 is formed with an elongated bearing portion 13 which accommodates the steering rod or shaft 14 and which is equipped with a lubricating passage 15 leading from a grease or oil cup 16. At one side, the body 10 is formed with a cylindrical flange member 17 which constitutes a housing for a gear mechanism to be described, and located centrally within said flange portion or concentrically with respect thereto is a trunnion 18.

Suitably secured upon the shaft or rod 14, as for instance by means of a clamping nut 19, is a pinion 20 located within a flange or housing portion 21 which is likewise formed on the body. In the present instance this pinion is shown as driven onto a tapered portion 22 of the shaft or rod 14, though it is obvious that any other desired means for making a positive connection may be adopted.

The numeral 23 designates the bar arm which is adapted to be connected with the steering arm in the usual manner, and this bar arm is provided with a hub portion 24 rotatably engaged upon the trunnion 18 and formed with a partial ring gear 25 meshing with the pinion 20. It will be observed that this ring gear 25 is located within the confines of the housing formed by the flange 17 so that dust, dirt or water will be excluded. Only a portion of this gear is toothed, the smooth portions 25$^a$ serving as stops to limit turning movement of the wheels. In order that adjustment may be made to take up wear and prevent backlash between the pinion 20 and gear 25, I have shown an adjusting washer 26 engaging outwardly of the end of the trunnion 18 and bearing against the hub portion of the bar arm, this washer having passing therethrough a pair of bolts 27 threaded into suitable sockets 28 in the trunnion. Obviously, by tightening these bolts the bar arm will be forced along the trunnion so as to make a tighter fit or mesh between the gear 24 and pinion 20. It will be observed that the bar arm is provided with an outstanding flange 29 which fits snugly within the confines of the flange 17 regardless of the adjusted position.

In order to exclude dust, dirt or other foreign matter from the pinion 20, I preferably make use of a cap 30 which extends over the end of the shaft or rod 14 and which is provided with suitable holes through which pass studs 31 or the like for securing this cap to the body 10.

In the operation of the device, it will be seen that when the rod or shaft 14 is turned by the steering wheel in the usual manner, the pinion 20 meshing with the gear 25 formed on the spindle arm will cause the spindle arm to rotate upon the trunnion 18 and of course move the steering gear in a well known manner. In actual practice it has been discovered that this steering gear is extremely easy to operate inasmuch as the reduction in the gearing enables the operator to apply greater power by turning the wheel. Another point of advantage is that this reduction gearing will operate to make the entire mechanism similar to the so-called irreversible type and the result will be that there will be less likelihood of the car swerving from its course in case of striking a stone, rut of other obstruction, or in case of muddy or slippery road conditions.

While I have shown and described the preferred embodiment of the invention, it should be understood that I reserve the right to make such changes in the form, construction and arrangement of parts as will not depart from the spirit of the invention or the scope of the subjoined claims.

Having thus described the invention, I claim:

1. In a steering mechanism, a body member provided with attaching means and formed to provide an elongated bearing member and a laterally extending trunnion, a steering shaft journaled through said bearing member, a pinion secured on said shaft, a bar arm adapted for connection with the steering rod of a vehicle and formed with a hub portion rotatably engaged upon the trunnion, and a ring gear on said hub portion meshing with said pinion, said ring gear being formed integrally upon the bar arm, said bar arm being formed with an outstanding flange, and said body being formed with a circular flange concentric with the trunnion and co-operating with said first named flange to define a housing for said gear.

2. In a steering mechanism, a body member formed with attaching means and provided with a laterally extending trunnion and an elongated bearing member, an operating shaft journaled through said bearing member, a pinion secured upon the end of said shaft, a circular flange formed on the body and surrounding said pinion, a circular flange on the body concentric with said trunnion, a cap secured upon said first named flange and enclosing the end of said shaft, an arm rotatably mounted on said trunnion and formed with a gear meshing with said pinion, and a washer member secured to the end of the trunnion and bearing against said arm whereby to effect adjustment of the arm longitudinally of the trunnion.

In testimony whereof I affix my signature.

HARDY A. FRIEND.